June 4, 1968  R. L. DERBYSHIRE ET AL  3,387,065
PRODUCTION OF IRRADIATED MATERIAL
Filed March 3, 1966
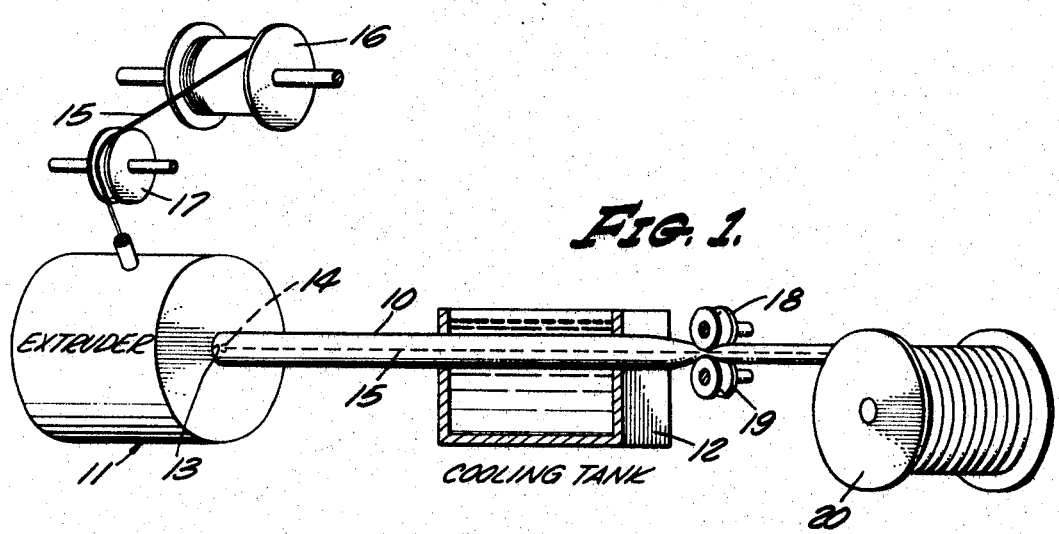
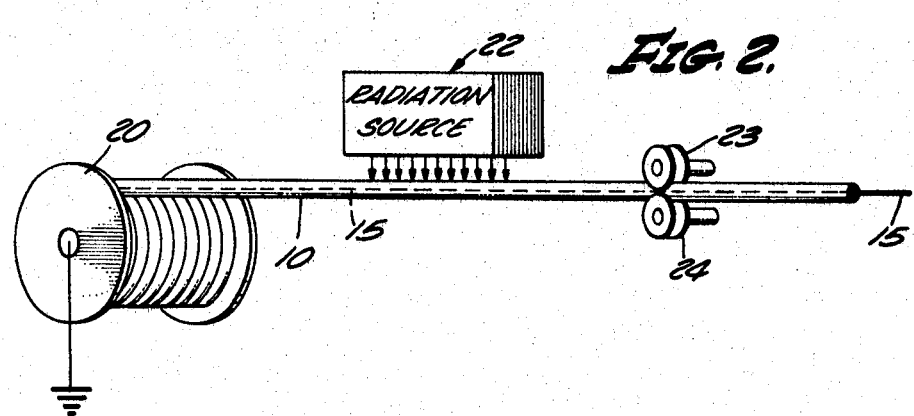
RODNEY L. DERBYSHIRE
FRED W. SCHERNIG
    INVENTORS.
BY *Lyon & Lyon*
        ATTORNEYS

United States Patent Office 3,387,065
Patented June 4, 1968

3,387,065
PRODUCTION OF IRRADIATED MATERIAL
Rodney L. Derbyshire, Menlo Park, and Fred W. Schernig, San Carlos, Calif., assignors to Raychem Corporation, Redwood City, Calif., a corporation of California
Filed Mar. 3, 1966, Ser. No. 531,458
12 Claims. (Cl. 264—22)

This invention relates to the production of irradiated polymeric material or articles and more particularly to the production of such material in the form of tubes which are free from minute holes therein.

Irradiated material or articles as discussed herein which have the property of elastic memory may be deformed from an original configuration. Such elastic memory materials are capable of changing dimension upon the application of heat to regain the original configuration. According to one well-known procedure for producing elastic memory articles, a polymeric material is first extruded or otherwise molded into a desired shape. The polymeric material is then crosslinked or given the properties of a crosslinked material by exposure to high energy radiation, e.g., a high energy electron beam. The crosslinked polymeric material is heated and deformed, and then locked in the deformed condition by quenching or other suitable cooling means. The deformed material will then retain its shape almost indefinitely until exposed to a temperature above its crystalline recovery temperature, e.g., approximately 250° F. in the case of polyethylene. Such methods for producing elastic memory articles are disclosed in Cook et al. U.S. Patent No. 3,086,242, and U.S. patent application Ser. No. 228,300, filed by Paul M. Cook on Oct. 4, 1962, the disclosures of which are incorporated herein by reference.

In producing heat-recoverable tubes or tubing, a heated thermoplastic material may be extruded in the form of a length of tube, or tubing, from an extruder and passed into a cooling tank. The tubing is drawn out of the cooling tank by means of rollers and fed through a crosslinking chamber wherein the tubing is exposed to a high energy radiation source, such as a high energy electron beam. The radiation is carried out in a manner known to those skilled in the art to ensure even irradiation on all sides as well as the correct amount of irradiation to provide the desired level of crosslinking. The crosslinked tubing generally is wound on a storage reel.

Subsequently, the tubing may be fed into a heating tank and then into an expansion assembly wherein the tubing is expanded, and then cooled so that it retains its expanded dimensions. The tubing then may be cut into the desired lengths. Said copending Cook application and U.S. patent application Ser. No. 259,018 now Patent No. 3,303,243, for Process for Producing Heat-Recoverable Articles, filed Feb. 18, 1963, by John R. Hughes, et al., the disclosure of which is incorporated herein by reference, disclose processes of extruding irradiating and expanding such tubing U.S. patent application Ser. No. 311,-715 entitled Process and Apparatus for Producing Plastic Memory Articles, filed Sept. 26, 1963, by Pierre Edward Wray discloses a continuous process for the production of articles of crystalline or crosslinked crystalline polymeric materials in the form of heat-shrinkable articles, and the disclosure thereof is incorporated herein by reference.

In the manufacture of relatively large heat-recoverable tubing, such as tubing having an inside diameter of approximately one inch and above, minute holes, or pinholes, have occurred as often in the tubing wall as every foot or two and substantially destroy the utility of the tubing as an insulating or protective material. These minute holes also cause blowouts during the expansion process which renders the production of large size heat-shrinkable tubing every difficult and very expensive.

After investigation it was discovered that hole-free tubing of this nature could be produced by inserting an electrical conductor, or drain wire, within the tubing, one end of the conductor being allowed to protrude from the tubing and being grounded. It has been hypothesized that the holes are caused by a static charge build-up on the interior tubing surface of levels great enough to cause dielectric breakdown of the tubing wall. A static discharge apparently occurs after the tubing has passed under the electron beam, arcing through the tubing wall to guide rollers or to other grounded equipment. It is believed that there are at least three important conditions which affect the dielectric breakdown of the tubing wall during irradiation. These are: (1) total absorbed dose, i.e., the lower the absorbed dose, the less severe the problem, (2) the interior surface area of the tubing per foot of tubing, i.e., the larger the surface area, the more severe the problem, (3) the wall thickness of the tubing, i.e., at a given diameter, a 50-mil wall has exhibited more severe dielectric breakdown than a 10-mil wall when irradiated with 1.4 mev. electrons. In the act of irradiation with high energy electrons, electrons lose some of their energy in passing through the polymer. It is believed that some electrons are thus trapped and appear as an interior surface charge. When this charge is large relative to wall thickness, sufficient potential is available to perforate the wall by exceeding the dielectric strength of the material.

Accordingly, it is an object of the present invention to provide an improved process for producing irradiated polymeric material.

It is an additional object of this invention to enable the production of substantially hole-free irradiated polymeric tubing.

It is a further object of the present invention to improve the manufacture of irradiated polymeric heat-recoverable tubing and to reduce the hazards attendant to the manufacture thereof.

These and other objects and advantages of the present invention will become more apparent upon reference to the accompanying drawing and description in which:

FIGURE 1 illustrates the manner in which an electrical conductor may be provided within tubing during the extrusion of the tubing; and FIGURE 2 diagrammatically illustrates an irradiation step in the process of manufacturing heat-recoverable tubing and the manner in which a charge build-up therein may be obviated.

According to an illustrative embodiment of the concepts of the present invention, an electrical conductor is provided within a length of tube prior to the irradiation thereof. During irradiation, the conductor is grounded to provide a charge bleed for any charge that may build-up within the tube.

More particularly in processing tubing according to an embodiment of the present invention, the tubing is extruded from an annular orifice of an extruder die, which die has a central air-hole therein through which an electrical conductor may pass. In this manner, the conductor, or drain wire, is inserted within the tube during extrusion. The extruded tube passes through a cooling trough, and preferably passes through rollers which close the tube onto the conductor to both pull the wire through the head of the extruder and maintain the wire taut within the extruded tube to prevent the wire from contacting the interior wall of the tube until the tube is relatively cool. After the tube is cooled and passes through the rollers it will be apparent that the wire will no longer be taut and thus will be loosely disposed in the tube. The tube then may be coiled on a reel. During irradiation of the tube by an electron beam, the wire is grounded, such as to a grounded payoff reel or frame, to provide a charge bleed. The tube subsequently may be expanded, with the wire ultimately being removed after expansion during the final cutting and packaging operation, or prior to expansion if desired.

Referring now to FIGURE 1, heated polymeric material is extruded in the form of a continuous length of tube 10 from an extruder 11 and passed into a cooling trough or tank 12. The extruder 11 includes a die head having an annular orifice 13, such as approximately one inch in diameter, through which the tube 10 is extruded and a central coaxial air-hole 14.

An electrical conductor, such as a wire 15, is fed from a reel 16 and over a pulley 17 into the die head of the extruder 11. The wire exists through the center of the die through the hole 14, and it will be apparent that the wire is substantially smaller in cross section than the interior of the tube 10 inasmuch as the wire should not touch the interior wall of the tube during cooling thereof.

Both the tube 10 and wire 14 pass through the cooling tank 12. The tube 10 passes through a set of nip rolls 18 and 19 at the end of the cooling tank 12. The nip rolls close the tube 10 onto the wire 14 thereby pulling the wire through the die head of the extruder 11. Sufficient friction preferably is maintained at the die head on the wire 15 so that the wire is maintained taut inside the extruded tube 10 and does not touch the interior wall of the tube 10 until the tube is relatively cool at the nip rolls. The tube 10 and wire 15 then may be coiled on a reel 20 preparatory to being irradiated.

After the tube 10 and wire 15 are coiled on the reel 20, the end of the wire 15 is connected through the reel or frame thereof as shown in FIGURE 2 to ground, or directly to a suitable ground. The tube 10 is irradiated by an electron beam of an electron generator 22, such as a General Electric Resonant Transformer electron accelerator. Rollers 23 and 24 may be used for drawing the tube 10 and wire 15 past the electron generator. The tube 10 may be coiled on a take-up reel (not shown) through which the wire 15 also may be grounded, or the tube and wire may be fed into an expansion assembly wherein the tube is heated, expanded and then cooled so as to retain its expanded dimensions as described previously. The wire 15 may be removed from the tube 10 prior to expansion thereof, but preferably is removed after expansion during a final cutting and packaging operation.

The drain wire may be inserted during extrusion as described above or be inserted in the tube after extrusion but prior to irradiation. Alternatively, a line or bead of semi-conductive plastic may be extruded in or on the interior surface of the tubing wall to serve as an integral charge drain which is grounded during irradiation. It is also possible to extrude a section of the wall using a semi-conductive plastic or extrude a complete internal liner of a semi-conductive plastic.

Hydrogen is an irradiation by-product in the electron beaming of certain olefinic polymers, and in addition to the elimination of holes in the tube wall, the sporadic detonation of hydrogen within the tube which is caused by spark discharge is eliminated by the present invention. Additionally, the potential shock hazard which may be experienced by operators in handling the tube after irradiation is eliminated.

The present embodiments of the invention are to be considered in all respects as illustrative and not restrictive, the scope of the invention being indicated by the appended claims rather than by the foregoing description, and all changes which come within the meaning and range of equivalency of the claims therefore are intended to be embraced therein.

What is claimed is:

1. A method of manufacturing an irradiated tube substantially free of minute holes in the wall thereof which comprises forming a polymeric material into a continuous tube, inserting a wire within said tube substantially along the entire length thereof, connecting said wire to ground, irradiating said tube with electrons while said wire is grounded, expanding said tube, causing said tube to retain its expanded configuration, and removing said wire from said tube.

2. A method of producing an irradiated tube substantially free of minute holes in the wall thereof, the steps of
  forming a length of polymeric tube,
  providing an electrical conductor within and substantially along said length of tube, said conductor having a substantially smaller cross-section than the interior of said tube,
  connecting said electrical conductor to ground,
  irradiating said length of tube with electrons while said conductor is grounded to crosslink the tube, and
  removing said electrical conductor from said tube.

3. A method as in claim 2 wherein
  said electrical conductor is a wire fed into said tube during forming thereof.

4. A method as in claim 2 wherein
  said tube is extruded, and
  said electrical conductor is a semi-conductive material extruded with said tube.

5. A method of producing an irradiated article comprising the steps of
  forming a continuous length of hollow polymeric material,
  providing an electrical conductor within and substantially coextensive with said length of said material during forming thereof, said conductor having a substantially smaller cross-section than the interior of said tube,
  cooling said length of material after forming thereof and maintaining substantially all of said electrical conductor out of contact with the interior wall of said length of material until cooled,
  connecting said electrical conductor to ground,
  irradiating said length of material with electrons while said conductor is grounded to crosslink the tube, and
  removing said electrical conductor from said length of material.

6. A process of producing an irradiated polymeric tube, the steps of
  forming a length of polymeric tube,
  inserting a wire within said tube substantially along the entire length of said tube, said wire having a cross-sectional size bearing a relationship to the cross-sectional size bearing a relationship to the cross-sectional size of the interior of said tube to prevent the wire from touching the interior wall of the tube if the wire is maintained taut,
  connecting said wire to ground, and
  irradiating said tube with electrons while said wire is grounded to crosslink the tube.

7. A process of producing an irradiated article, comprising the steps of
  extruding a polymeric material into a continuous tube,
  providing an electrical conductor smaller than the inside diameter of said tube within and substantially along the length of said tube during extrusion thereof, said conductor having a substantially smaller cross-section than the interior of said tube,
  connecting said electrical conductor to ground,
  irradiating said tube with electrons while said conductor is grounded to crosslink the tube, and
  removing said conductor from said tube.

8. A process of producing an irradiated article comprising the steps of
  extruding a polymeric material into a continuous tube having an inside diameter of approximately one inch or larger,
  providing a wire within and substantially coextensive with the length of said tube and substantially adjacent the interior surface thereof, said wire having a substantially smaller cross-section than the interior of said tube, connecting said wire to ground, irradiating said tube with electrons while said wire is grounded to crosslink the tube, and removing said wire from said tube.

9. A method of producing an irradiated article comprising the steps of forming a continuous length of hollow polymeric material, providing an electrical conductor within and substantially coextensive with said length of said material during forming thereof, said conductor having a substantially smaller cross-section than the interior of said tube, cooling said length of material after forming thereof, and pressing a portion of said material against said electrical conductor after cooling of said portion to maintain said electrical conductor taut within the remainder of said length of material to prevent substantially all contact between said conductor and the interior of said remainder of said length of material during cooling of said remainder, connecting said electrical conductor to ground, irradiating said length of said material with electrons while said conductor is grounded to crosslink the tube, and removing said electrical conductor from said length of material.

10. A method of manufacturing a tube substantially free of minute holes in the wall thereof wherein said tube is formed of polymeric material, cooled and irradiated, the steps comprising forming a polymeric material into a continuous tube, cooling said tube, inserting an electrical conductor within said tube substantially along the entire length thereof after forming and cooling said tube, said conductor having a substantially smaller cross-section than the interior of said tube, connecting said electrical conductor to ground, irradiating said tube with electrons while said electrical conductor is grounded to crosslink the tube, and removing said electrical conductor from said tube.

11. A method of manufacturing an irradiated tube substantially free of minute holes in the wall thereof by using a die head having an annular orifice and a central air hole smaller than said orifice, comprising the steps of extruding polymeric material into a continuous tube through said orifice, inserting a wire through said air hole into said tube during extrusion thereof and substantially along the entire length of said tube, said wire having a substantially smaller cross-section than the interior of said tube, connecting said wire to ground, irradiating said tube with electrons while said wire is grounded to crosslink the tube, and removing said wire from said tube.

12. In a process of producing an irradiation crosslinked polymeric tube, the steps of inserting an electrical conductor substantially smaller in cross-section than the interior of said tube within said tube substantially along the entire length of said tube, connecting said conductor to ground, and crosslinking said tube by irradiating with electrons while said conductor is grounded.

References Cited

UNITED STATES PATENTS

| | | | |
|---|---|---|---|
| 2,887,721 | 5/1959 | Blanchi | 264—22 X |
| 2,948,665 | 8/1960 | Rubens | 264—22 X |
| 3,017,339 | 1/1962 | Dewey | 264—22 |

FOREIGN PATENTS 766,802  1/1957  Great Britain.

ROBERT F. WHITE, *Primary Examiner.*

J. H. SILBAUGH, R. B. MOFFITT,

*Assistant Examiners.*